United States Patent [19]
Viswanathan

[11] 4,085,288
[45] Apr. 18, 1978

[54] PHASE LOCKED LOOP DECODER

[75] Inventor: Lakshminarasimhan Viswanathan, Audubon, Pa.

[73] Assignee: Computer Peripherals, Inc., Rochester, Mich.

[21] Appl. No.: 734,844

[22] Filed: Oct. 22, 1976

Related U.S. Application Data

[63] Continuation of Ser. No. 572,424, Apr. 28, 1975, abandoned.

[51] Int. Cl.² .............................................. H03B 3/04
[52] U.S. Cl. .................................... 178/69.1; 331/1 A
[58] Field of Search ................ 325/320; 178/67, 69.1; 358/261; 328/133; 329/50, 122, 124; 307/233, 269; 331/1 A

[56]  References Cited
U.S. PATENT DOCUMENTS 3,675,129  7/1972  Melvin ................................. 328/133
3,805,180  4/1974  Widmer ........................... 178/69.1 R
3,956,710  5/1976  Seitz et al. ........................ 328/133 X Primary Examiner—Benedict V. Safourek
Attorney, Agent, or Firm—J. T. Cavender; Wilbert Hawk, Jr.

[57]  ABSTRACT

A phase locked loop decoder for decoding digitally encoded data is disclosed in which each incoming data bit is synchronized to a clock frequency and a derived signal representative of the data cell width is varied in accordance with a derived phase error signal to compensate for bit shift and for data cell width variation which may be present in the incoming data. The phase error signal is a pulsed waveform having a leading edge synchronized with the occurrence of each data transition and a pulse width reprsentative of the phase error of the data with respect to the clock. The decoder will detect and decode data transitions having bit shifts of up to plus or minus 50 percent of the bit cell period.

16 Claims, 4 Drawing Figures

PHASE LOCKED LOOP DECODER

This is a continuation, division, of application Ser. No. 572,424, filed Apr. 28, 1975 abandoned.

BACKGROUND OF THE INVENTION

1. Field of the Invention

The present invention relates generally to phase locked loop data decoders and more particularly to a decoding system for detecting digitally encoded data such as NRZI (non-return to zero input) type group code recorded data having varying degrees of bit shift. While the present decoding technique is not limited to any particular type of data encoding scheme nor to any particular data containing medium, the invention is described with reference to data recorded on magnetic tape.

2. Description of the Prior Art

Present day data processing, storage and retrieval systems frequently employ magnetic tape as a data storage medium, upon which data is stored in the form of magnetized areas, between which areas exist magnetic flux transitions. The position of a particular flux transition on the magnetic tape may be defined as that point which exhibits the maximum free space surface flux density normal to the tape surface. The space allocated for a single data bit on the magnetic recording medium is defined as the bit cell length, while the nominal distribution per unit length of cells on the magnetic recording medium is the data density. As the data density with which information is recorded on magnetic tape increases, various undesirable effects occur which affect the reliability of the recovery of such data. The magnetic interaction of the densely distributed magnetic flux transitions, known as "bit crowding", produces an effect called bit shift or peak shift, in which the transitions of the recorded data read from the magnetic medium are moved or shifted from their proper positions in time within the bit cells. For a particular density of recording, the bit shift will also substantially vary depending upon the method by which data is encoded on the magnetic medium. A well known encoding technique is the NRZI encoding technique, by which a flux reversal occurs whenever a logical "one" is recorded, with no fixed magnetization state being assigned to the "one" state. Thus, a flux reversal or transition is recorded for each logical "one" while no flux reversals or transitions occur for logical "zeros". When NRZI data is read back from a magnetic medium bit shift is especially pronounced whenever one or more logical zeros occur following (or preceding) a long string of consecutive logical ones in a random fashion. Another problem which occurs when a number of zeros greater than two must be decoded is phase drift and resultant loss of synchronization in a phase locked loop decoder, which remains synchronized to the incoming data only when transitions are continuously detected. This clock loss, which results from attempting to decode an indeterminate number of zeros is sometimes referred to as "downstream bit shift effect". Additionally, changes in the rate at which data is encoded or read, such as variation in the instantaneous tape speed in magnetic tape systems causes variation in the bit cell width.

Encoding techniques used in present magnetic recording reduce, but do not totally eliminate the above-described decoding problems. One such encoding technique is Group Code Recording (GCR), by which groups of characters or data bits are encoded prior to being recorded on the magnetic recording medium. In an exemplary GCR recording, a four-digit code is converted into a five-digit code which is configured in part such that no more than two data "zeros" occur serially. This coding is described in detail by U.S. Pat. No. 3,639,900 of H. C. Hinz, Jr. and U.S. Pat. No. 3,624,637 of J. W. Irwin. Such encoding techniques are sometimes called run-length-limited codes since the number of zeros which can occur in succession is limited. The Irwin patent also describes a resynchronization system in which special indicia are recorded and interleaved among the data signals.

Various self-synchronization systems have been proposed by which the readback data is clocked by means of a variable frequency oscillator. Such systems are referred to in U.S. Pat. No. 3,789,380 of M. R. Cannon, which patent also describes a digital recording system in which data is recorded and read back from a magnetic medium in association with a control signal having an integral multiple of the given repetitive frequency for clocking the data to provide readback synchronization. Cannon enhances resynchronization of recorded data by frequency interleaving resynchronization signals or marker points in the recorded data.

SUMMARY OF THE INVENTION

The present invention comprises a phase locked loop data decoder for decoding NRZI data in the presence of bit shifts of up to plus or minus 50 percent of the bit cell period, without decoding error. A phase locked loop circuit synchronizes the incoming data to a clock frequency which is variable in response to the phase error of the incoming data by means of a voltage controlled oscillator having a control voltage which is a function of the analog phase error between the incoming data and the generated clock. The phase error is a digital pulsed waveform having a leading edge synchronized to the incoming data and a pulse width corresponding to the phase difference between the incoming data and the synchronizing clock. As long as an incoming data transition occurs at any time during the bit cell period, it is detected and decoded. The present invention provides self-synchronization without the use of recorded frequency or phase synchronization markers. The occurrence of data transitions is synchronized to the clock rather than to any particular location in the bit cell.

It is therefore an object of the present invention to provide a phase locked loop data decoding system for decoding digitally encoded data having a bit shift of up to plus or minus fifty percent of the bit cell width.

It is another object of the present invention to provide a self-synchronizing data decoder which is substantially insensitive to bit shift.

It is yet another object of the present invention to provide a phase locked loop data decoder for substantially error free decoding of data.

It is yet another object of the present invention to convert NRZI type data into data pulses having a cell width which is variable in accordance with the data phase error.

The foregoing and other objects, features and advantages of the invention will be apparent from the following more detailed description of a preferred embodiment of the invention, as illustrated by the accompanying drawings.

DESCRIPTION OF THE PREFERRED EMBODIMENT

Figure 1:
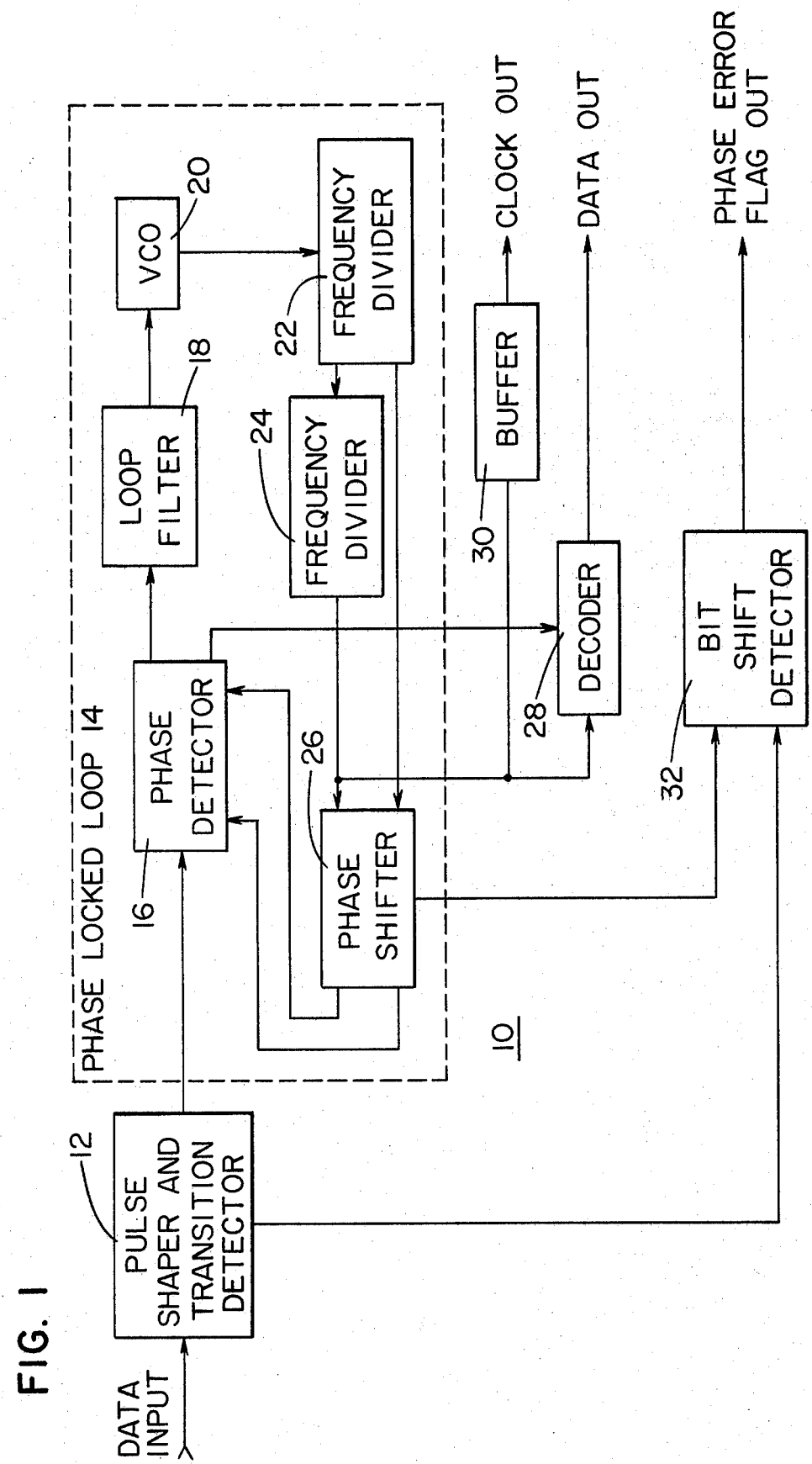
FIG. 1 is a block diagram of a phase locked loop detector and decoder in accordance with the present invention.

Referring now to FIG. 1, a phase locked loop detector for clocking and decoding bit shifted digital data is disclosed generally at 10. While in the illustrated embodiment and accompanying waveform diagrams the data is illustrated as of the NRZI type, it is to be understood that the invention is also applicable to digital data recorded by other methods, such as the phase shift or "Manchester" method. Additionally, "NRZI type data" is intended to include other well known modified NRZ coding methods such as NRZ-1, non-return-to-zero mark (NRZ-M)1, NRZ-Module 2 (commonly called "the IBM method"), etc.

Figure 2:
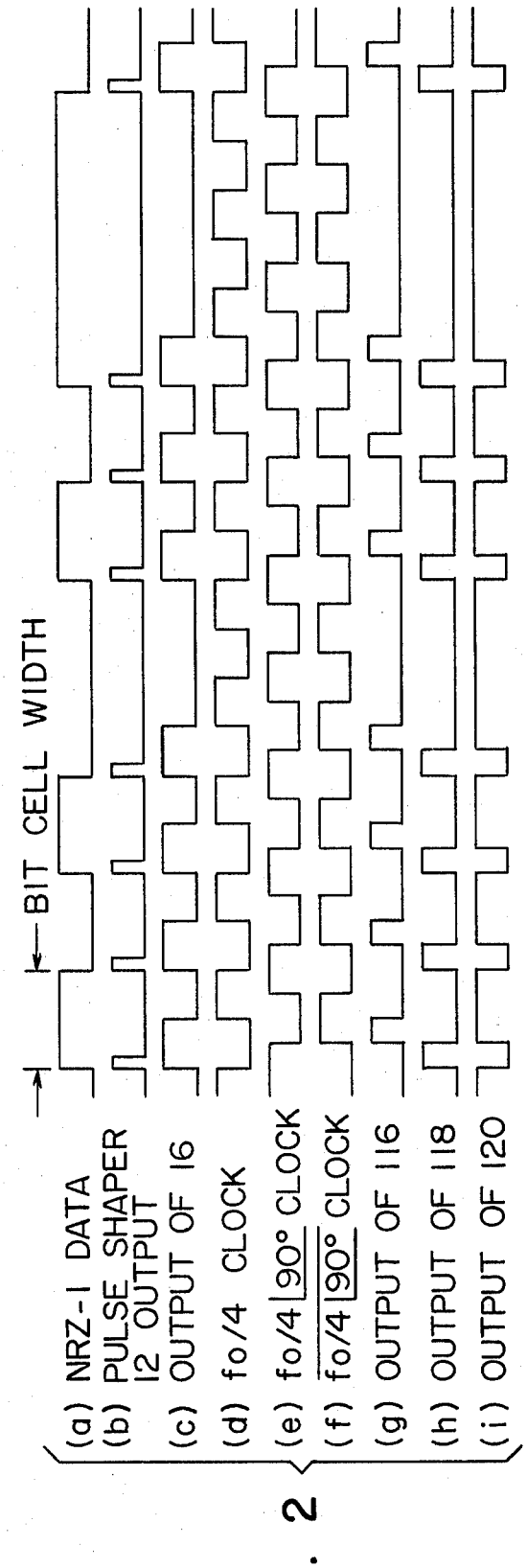
FIGS. 2(a) through 2(i) are timing diagrams illustrative of the operation of the decoder of FIGS. 1 and 3.

Data is read from a magnetic medium such as magnetic tape upon which it is recorded by means of a reading head, and is coupled as an NRZI data waveform having varying degrees of bit shift associated with the occurrence of the data transitions, to a pulse shaping circuit 12, which circuit detects the occurrence of the data transitions. A typical NRZI type waveform without bit shift is illustrated by FIG. 2(a). The illustrated NRZI encoded waveform represents the binary digits 1 1 1 1 0 1 1 1 0 0 1, each of which digits is encoded during the bit cell period associated with that digit, and having a typical bit cell period as illustrated. The transition detection and pulse shaping network 12 generates a train of narrow strobe pulses in response to the NRZI input data which corresponds to each occurrence of a logical "one" in time the transition points of the NRZI input, and which are illustrated by waveform 2(b). Alternatively, the input data may be coupled directly from a communications channel to the transition detector and shaping network 12.

The outut of the pulse shaping network 12 is coupled to a phase locked loop 14 which includes a phase error detector 16, loop filter 18, a voltage controlled oscillator 20, frequency dividers 22 and 24 and a phase shifter 26. The phase locked loop synchronizes the incoming data input to a generated clock signal which varies in frequency in accordance with variations in the incoming data frequency. Phase detector 16 receives the data strobe pulses and generates an output indicative of the digital phase of the incoming data with respect to the generated clocking signal. Phase error results when the aforementioned bit shift effect displaces the transition from one bit cell to the next bit cell from its proper position in time. A typical bit cell width is 800 nanoseconds, and when no bit shift exists, as is the case illustrated by the waveforms of FIG. 2, the output of phase detector 16 corresponds to waveform 2(c), or one-half of the bit cell width. As will become apparent with reference to FIGS. 3 and 4, when bit shift is introduced into the input data, the derived digital phase error is used to generate an analog phase error voltage which operates to vary the control voltage of a voltage controlled oscillator (VCO) 20, which in turn continuously varies the synchronizing clock frequency in accordance with the phase error occurring bit by bit to enable continuous synchronization between the incoming data and the generated clock, which in turn enables accurate data decoding in the presence of bit shift.

The analog phase error voltage which controls the frequency of VCO 20 is derived from the digital phase error by means of a loop filter 18 having a bandwidth large enough to insure "acquisition" or "lock" during which time the control voltage reaches its full value and which time is short enough to insure locking during the data preamble — an "all ones" signal on the magnetic tape preceding the data signal — but long enough to avoid locking to noise or other false data transitions. Generally, the most desirable loop filter 18 characteristics are such that it is substantially insensitive to short time data frequency variations caused by bit shift, but is sensitive to long time variation of the bit cell period caused by conditions such as tape speed variations when the recording medium is magnetic tape. Also, the loop filter capture time should be small over the desired capture range.

The analog phase error $\theta$ is:

$$\theta = k(T_d - T_c),$$

where:

$k$ is a constant which is the product of the phase detector and the loop dc gains, $T_d$ is the bit cell period, and $T_c$ is the clock period. In the absence of bit shift, the phase detector pulse width shown by waveform 2(c) is $\frac{1}{2} T_c$, i.e.;

$$T_d = T_c$$

The output frequency of VCO 20, $f_o$, is, for example 5 MH$_z$ with a period of 200 nanoseconds. The clock frequency $f_{o/4}$ is derived by two divide-by-two networks 22 and 24. The $f_{o/4}$ clock shown by waveform 2(d) is applied to phase shifter 26 which shifts the clock phase by 90° and derives a pair of complementary clock signals, $f_{o/4} \angle 90°$ and an inverted $f_{o/4} \angle 90°$, illustrated by waveforms 2(e) and 2(f), respectively. The complementary clock signals, which lag and lead the $f_{o/4}$ clock by 90°, respectively, are coupled to the phase detector 16 wherein they are individually AND'ed with the digital phase detector output signal. The phase detector output from which the analog control voltage is derived is thus actually waveform 2(g) and waveform 2(h), which are representative of the time coincidence between the complementary $f_{o/4}$ leading and lagging clock signals with the phase error. As will be explained with reference to FIG. 3, waveform 2(h) is inverted before being summed with waveform 2(g) in the loop filter, and is illustrated by waveform 2(i).

The primary function of decoder 28 is to decode incoming data as represented by the digital phase detector signal 2(d) in synchronization with the $f_{o/4}$ clock, waveform 2(e). Decoder 28 decodes data as long as the data level remains unchanged during the applied $f_{o/4}$ clock; that is, as long as no NRZI transition occurs in coincidence with the clock. When the clock Tc is $\frac{1}{2}$ Td, it is apparent that when Tc is AND'ed in the phase detector 16 with the phase error, when phase error exists due to bit shift, the width of the phase detector output pulse 2(c) will increase or decrease depending upon the bit shift. As long as the absolute amount of bit shift does not exceed 50 percent of the bit cell width, an output pulse will occur from the phase detector. After 50 percent bit shift the AND'ed inputs are not coincident, hence there is no output and any transition so shifted would occur in an adjacent bit cell, and would, of course, be erroneous. By varying the digital phase detector output pulse width being decoded to correspond to the phase error, erroneous data is not decoded at all because a 50 percent shifted transition causes the error pulse to disappear. The $f_{o/4}$ clock is coupled to a buffer gate 30 for coupling to a data utilization means, which may be a central controller or a computer. As previously mentioned, as long as the leading edge of the clock is present prior to a data transition, thereby enabling decoding with a bit shift of up to plus or minus 50 percent of the nominal cell period, decoding occurs. However, as a precaution against decoding data having such large bit shifts, an "excessive bit shift error flag" is generated by a bit shift detector 32 whenever the absolute phase error difference between the $f_{o/4}$ clock and the incoming NRZI data exceeds a predetermined value, such as 37½ percent.

Figure 4:
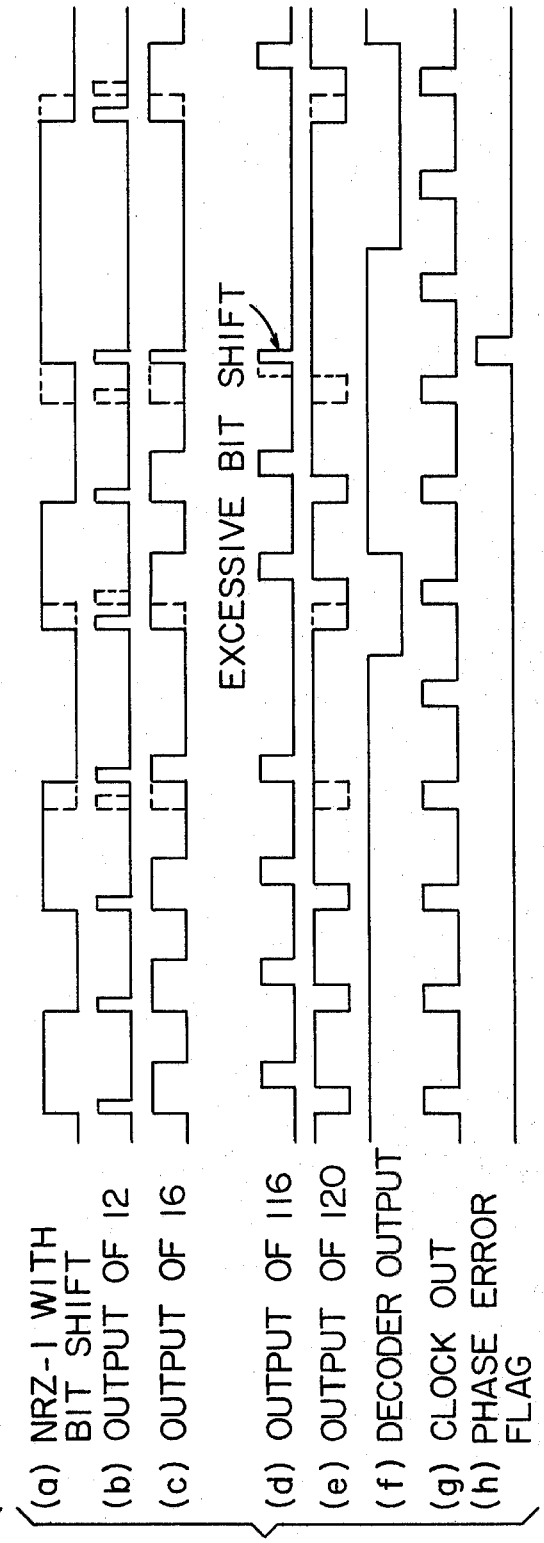
FIGS. 4(a) through 4(h) are timing diagrams further illustrative of the operation of the decoder of FIGS. 1 and 3.
Figure 3:
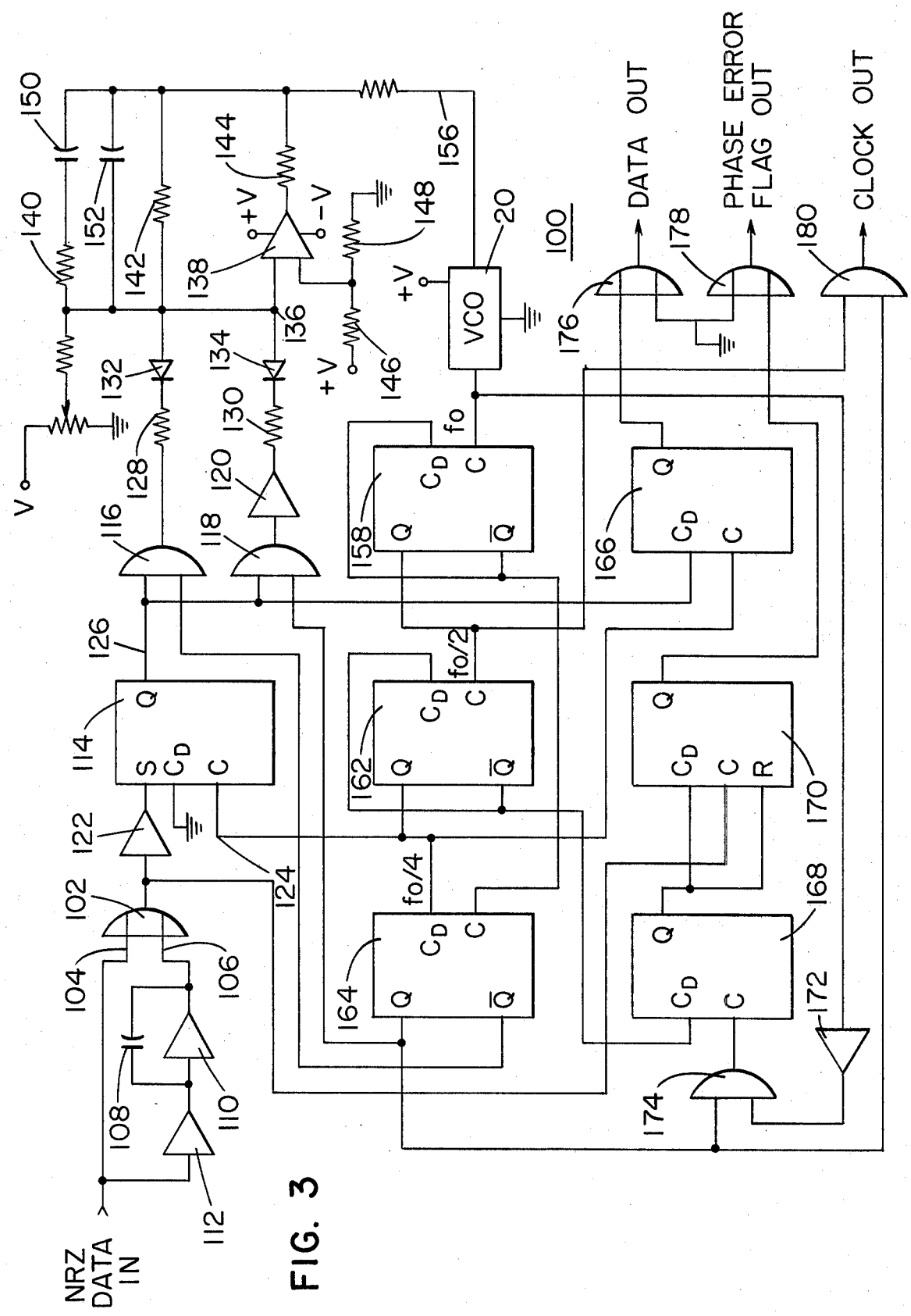
FIG. 3 is a more detailed block and schematic diagram of the invention illustrated by FIG. 1.

Referring now to FIGS. 3 and 4, the operation of the phase locked loop decoder described with reference to FIG. 1 is illustrated in greater detail generally at 100 in FIG. 3 to illustrate the effect of bit shifted data on the circuit operation. The bit shifted NRZI type encoded data shown by waveform 4(a) causes an output pulse to be generated by the pulse shaping network 12 at each data transition of the NRZI input, as illustrated by waveform 4(b). The dotted lines illustrate the points in time when the data pulses and the corresponding waveforms generated by the decoding and detection circuitry would occur were there no bit shift, while the solid lines illustrate the actual pulse occurrences with bit shift present.

Pulse shaping and data transition detection network 12 includes an exclusive OR gate 102 to which the undelayed NRZI data is coupled at input 104 thereof and to which the same NRZI data is coupled at input 106 after a short delay. The delay is caused by capacitor 108 across an inverting flip-flop 110, which re-inverts the NRZI data after initial inverting by flip-flop 112 to maintain correct polarity for generating the narrow positive going pulses shown by waveform 4(b), the duration of which pulses corresponds to the delay imparted by capacitor 108. The negative going inverted pulses from inverter 112 are used to asynchronously set the phase detector flip-flop 114 which, together with AND gates 116 and 118 and inverter 120 comprises the phase detector 16. Flip-flop 114 is a D-type positive edge triggered device. When the negative going data pulses appear at the SET input of flip-flop 114 after inversion by inverter 122, and the unshifted clock frequency $f_{o/4}$ appears at the clock input thereof at 124, the digital phase between the clock and NRZI input, illustrated by waveform 4(c) is generated at the output terminal 126 of flip-flop 114. This digital phase output is coupled to AND gates 116 and 118, with the $f_{o/4}$ 90° shifted clock applied as the other input to AND gate 118 and the inverted $f_{o/4}$ 90° shifted clock applied as the other input to AND gate 116. The output of AND gate 116, shown by waveform 4(d) is ideally ½ Tc, where Tc is the $f_{o/4}$ clock period. This condition occurs in the absence of bit shift. Similarly, the complementary output of AND gate 118, after inverting by inverter 120, is illustrated by waveform 4(e) and is also ideally ½ Tc.

The outputs of AND gates 116 and 118, which are of the same frequency, $f_{o/4}$, but lag and lead the clock $f_{o/4}$ by 90°, are algebraically added by resistors 128 and 130, respectively, to derive a composite current used in deriving the analog phase error correcting voltage. A leading bit shift generates a positive correcting voltage in the loop filter 18 while a lagging bit shift generates a negative correcting voltage. A positive correction voltage causes the frequency of VCO 20 to increase while a negative correction voltage results in a decreased VCO 20 output frequency, which in turn either increases or decreases the complementary clock signal frequency $f_{o/4}$ applied to AND gates 116 and 118. Since the clock frequency remains constant unless the cell time changes from the shifting of a data transition, it is apparent that the generated clock is synchronous with the incoming data.

The summed phase detector current coupled through blocking diodes 132 and 134 at summing junction 136, which current is proportional to the phase difference between the clock and data signals, is coupled to an operational amplifier 138 which is part of the loop filter 18, and includes a compensating network comprising resistors 140, 142, 144, 146 and 148 and capacitors 150, and 152 to insure that the analog output voltage applied to the voltage controlled multivibrator 20 at input 156 is insensitive to phase error due to bit shift of data, but is sensitive to variation in the bit cell period. Such variation in the bit cell period may be caused, for example, by instantaneous speed variation (ISV) of the magnetic tape.

The VCO 20 output, $f_o$, is coupled to a divide-by-two circuit 158 to derive $f_{o/2}$ output, which output is coupled to another divide by two circuit 162 to derive the $f_{o/4}$ clock, which, as previously described, is converted to leading and lagging 90° complementary signals by phase shifter 164, which phase shifted signals are coupled to AND gates 116 and 118. Data is recovered in the decoder flip-flop 166 by coupling the digital phase detector waveform 4(c) from output 126 of phase detector flip-flop 114 thereto with clocking provided by the unshifted $f_{o/4}$ clocking signal coupled from frequency divider 162. The output of decoder 166 is illustrated by waveform 4(f) as an RZ output. The rising edge of the clock occurs in the middle of the bit cell. The decoded output remains HI (logical one) through the first four "ones", then goes LO for the first "zero", then HI for the next three "ones", then LO again for the next "zero". The digital phase detector signal, ideally ½ Tc is also twice the clock $f_{o/4}$. As can be seen by an examination of waveform 4(d), the bit marked "excessive shift" does not occur near the rising edge of the clock occurring at the middle of the cell period, but rather occurs near the end of a bit cell which indicates a bit shift approaching 50 percent. Accordingly, an error flag is generated by the excess bit shift detector 32 as indicated by waveform 4(h).

The bit shift phase error pulse is generated by setting flip-flops 168 and 170 of error detector 32 to compare the NRZI input data of the $f_{o/4}$ clock to generate an output pulse whenever a predetermined phase error is exceeded. Of course, the digital phase detector pulse of waveform 4(c) would disappear entirely at 50 percent bit shift since not enough time would remain in the cell period within which to generate the pulse. The bit shift detector 32 causes an error pulse to be generated before such an extreme bit shift occurs as a precaution against the possibility of a decoding error. The $f_o$ output of VCO 20 is inverted by inverter 172 and AND'ed with the shifted $f_{o/4} \angle 90°$ clock at AND gate 174. The output of AND gate 174 is applied as one input to flip-flop 168, the other input being the unshifted $f_{o/4}$ clock. The output of flip-flop 168 is then compared to the NRZI input data at comparator flip-flop 170, which comparator generates the phase error flag. The output data, the phase error flag and the $f_{o/4}$ clock are coupled to the data utilization means via output buffer OR gates 176 and 178 and AND gate 180, respectively.

The integrated circuit components described with reference to FIG. 3 may comprise Texas Instruments part No. 74S74 for flip-flops 114, 158, 162, 164, 166, 168 and 170; part No. 74S08 for all AND gates, and part Nos. 74S04 and 74S86 for the inverter gates. Additionally, only those connections of flip-flops 158, 162, 164, 166, 168 and 170 which are utilized by the circuit of FIG. 3 are illustrated, for clarity of description. All unused input pin connections are raised to a HI logic level at all times. Thus, the SET and RESET connections of flip-flops 158, 162, 164, 166 and 168 are HI, as is the SET connection of flip-flop 170.

While the invention has been shown and described with reference to the preferred embodiments thereof, it will be understood that persons skilled in the art may make modifications thereof without departing from the spirit and scope of the invention as defined by the claims appended hereto.

What is claimed is:

1. Phase locked loop decoder for decoding data signals having a given frequency and representative of digitally encoded data bits, each bit being encoded within a bit cell, comprising:
    clock means for generating a data clocking signal for each bit cell;
    phase error detection means for generating a digital pulsed phase error signal having a leading edge synchronized with the occurrence of each transition of said data signal within each bit cell and having a pulse width representative of the difference in time of occurrence of said data signal with respect to said cell clocking signal, and having an output;
    clock synchronizing means responsive to said phase error signal for maintaining substantially continuous synchronization between said data signals and said clocking signal by advancing or retarding subsequent clocking signals; and
    data decoder means synchronized by said clocking signal for decoding said output of said phase error detection means at said given frequency.

2. Phase locked loop decoder in accordance with claim 1 further comprising:
    means for receiving said data signals and for generating output pulses having a narrow width with respect to said bit cell width upon each data transition; and wherein
    said pulsed phase error signal generated by said detection means has its leading edge synchronized in each instance with the leading edge of each of said narrow width output pulses and its trailing edge synchronized in each instance with the leading edge to the next succeeding clocking signal.

3. Phase locked loop decoder in accordance with claim 1 wherein, in the absence of any difference in time of occurrence between said data and clocking signals, said phase error signal defines a pulse width which equals one half of said bit cell period and said clocking signal is of a pulse width period which is equal to one half of said phase error pulse width period.

4. Phase locked loop decoder in accordance with claim 1 further comprising:
    means for detecting a phase error indicative of a difference in time of occurrence between said data and clocking signals above a predetermined absolute amount, said predetermined absolute amount being between but not equal to plus or minus 50 percent of the bit cell period and for generating an output signal whenever said difference exceeds said predetermined absolute amount.

5. Phase locked loop decoder in accordance with claim 1 wherein said digitally encoded data bits comprise a run-length limited type code having a maximum of two zeros in adjacent bit cells.

6. Phase locked loop decoder in accordance with claim 1 wherein said clock means includes a voltage controlled oscillator and said clock synchronizing means includes:
    means for receiving said digital phase error signal;
    means for deriving an analog voltage representative of said digital phase error signal; and
    means coupling said analog voltage to said voltage controlled oscillator such that said oscillator signal frequency is decreased when said analog voltage is negative and increased when said analog voltage is positive, said negative analog voltage being indicative of a lagging bit shift and said positive analog voltage being indicative of a leading bit shift, and such that said analog voltage is proportional to the algebraic phase difference between said data and clock transitions for each bit cell.

7. Phase locked loop decoder in accordance with claim 6 further comprising:
    frequency division means for dividing said data clocking signal into a pair of complementary clocking signals, said data clocking signal being an integral multiple of the frequency of said complementary clocking signals;
    phase shifting means for imparting a 90° lagging phase shift to one of said complementary clocking signals and a 90° leading phase shift to the other of said complementary clocking signals; and
    gating means for combining said digital phase error signal with said pair of complementary clocking signals to derive a composite phase error signal.

8. Phase locked loop decoder in accordance with claim 7 wherein the periods of said leading and lagging complementary clocking signals are equal and in the absence of any difference in time of occurrence between said data and clocking signals occur in time coincidence with one half of the pulse width period of said digital phase error signal.

9. Phase locked loop decoder in accordance with claim 7 wherein said gating means comprises:
    a first AND gate having said digital phase error signal coupled to one input thereof and said lagging complementary clocking signal coupled to another input thereof, and having an output coupled to said analog voltage deriving means; and
    a second AND gate having said digital phase error signal coupled to one input thereof and said leading complementary clocking signal coupled to another input thereof, and having an output coupled to said analog voltage deriving means.

10. Phase locked loop decoder in accordance with claim 7 wherein said data decoder means comprises a flip-flop circuit having said digital phase error signal as the data input thereto and said frequency divided clocking signal as the clock input thereto, said input clocking signal to said decoder being frequency divided but unshifted in phase by said phase shifter.

11. Phase locked loop decoder in accordance with claim 10 wherein said decoder flip-flop circuit decodes the data input thereto as long as the level of said data input remains unchanged during the leading edge of said clocking signal.

12. A system for decoding data encoded on a magnetic medium comprising:
  means for deriving a digital data input signal representative of said encoded data, said data input signal having a varying frequency and varying data bit cell widths;
  phase locked loop means for generating a clock signal at a varying frequency such that said clock signal is substantially continuously synchronized with said data input signal, and having an output;
  decoding means for decoding the output of said phase locked loop means at a frequency determined by said clock signal, and
  phase error signal generation means associated with said phase locked loop means for generating a digital pulsed phase error signal having a leading edge synchronized with the occurrence of each transition of said data input signal and having a pulse width representative of the difference in time of occurrence of said data signal with respect to said clock signal, for advancing or retarding said clock signal to drive said substantially continuously synchronized clock signal.

13. A system in accordance with claim 12 wherein said digital data comprises a run-length limited NRZI type code defining a maximum of two zeros which can occur in succession.

14. A system in accordance with claim 12 wherein said phase locked loop means includes a voltage controlled oscillator having a control voltage coupled thereto, said voltage being derived from said phase error signal such that variation of the bit cell width of said data input signal causes said oscillator frequency to vary therewith; and said system further comprising:
  flip-flop circuit means for dividing the output frequency of said voltage controlled oscillator by an integral multiple of said frequency, and having an output;
  second flip-flop circuit means for deriving a pair of complementary clocking signals, each of said clocking signals having a frequency determined by said flip-flop circuit means output;
  third flip-flop circuit means for phase shifting one of said complementary clocking signals to lead said flip-flop circuit means output by 90° and the other complementary clocking signal to lag said flip-flop circuit means output by 90°; and
  AND gate means associated with said phase error signal generating means for deriving a pair of output signals, one of such output signals being representative of the coincidence of said phase error signal and said leading complementary clocking signal and the other of such output signals being representative of the coincidence of said lagging complementary clocking signal and said phase error signal.

15. A system in accordance with claim 14 further comprising:
  resistor means for combining said pair of output signals to derive an analog correction voltage; and
  means coupling said analog correction voltage to said voltage controlled oscillator.

16. A system in accordance with claim 14 wherein said output frequency of said voltage controlled oscillator is $f_o$, the frequency of the output of said second flip-flop circuit means is $f_{o/4}$, the frequency of said phase error correction signal, in the absence of difference in the time of occurrence of the data input and clock signals, is $f_{o/4}$, and the width of said phase error correction signal in the absence of such difference is equal to one-half of the corresponding data bit cell width.

* * * * *